(12) United States Patent
Xue et al.

(10) Patent No.: US 12,466,714 B2
(45) Date of Patent: Nov. 11, 2025

(54) TELESCOPIC DEVICE AND CARRYING ROBOT

(71) Applicant: SHANGHAI QUICKTRON INTELLIGENT TECHNOLOGY CO., LTD, Shanghai (CN)

(72) Inventors: Rui Xue, Shanghai (CN); Chenghao Zhang, Shanghai (CN); Songxiang Fang, Shanghai (CN); Zhenyu Cui, Shanghai (CN)

(73) Assignee: SHANGHAI QUICKTRON INTELLIGENT TECHNOLOGY CO., LTD, Shanghai (CN)

( * ) Notice: Subject to any disclaimer, the term of this patent is extended or adjusted under 35 U.S.C. 154(b) by 428 days.

(21) Appl. No.: 17/755,209

(22) PCT Filed: Oct. 22, 2020

(86) PCT No.: PCT/CN2020/122781
§ 371 (c)(1),
(2) Date: Apr. 22, 2022

(87) PCT Pub. No.: WO2021/078191
PCT Pub. Date: Apr. 29, 2021

(65) Prior Publication Data
US 2023/0038475 A1 Feb. 9, 2023

(30) Foreign Application Priority Data

Oct. 23, 2019 (CN) .......................... 201911014146.0
Oct. 23, 2019 (CN) .......................... 201921794310.X
Oct. 23, 2019 (CN) .......................... 201921795638.3

(51) Int. Cl.
*B66F 9/14* (2006.01)
*B25J 5/00* (2006.01)
*B25J 9/00* (2006.01)

(52) U.S. Cl.
CPC ............... *B66F 9/141* (2013.01); *B25J 5/007* (2013.01); *B25J 9/0009* (2013.01); *B66F 2700/09* (2013.01)

(58) Field of Classification Search
CPC .......... B65G 1/0435; B66F 9/141; B66F 9/12; B25J 9/0009; B25J 5/007
See application file for complete search history.

(56) References Cited

U.S. PATENT DOCUMENTS 11,820,004 B2 * 11/2023 Kong .................... B66F 9/07
11,827,451 B2 * 11/2023 Iwata ................... B65G 1/1375
(Continued)

FOREIGN PATENT DOCUMENTS

CN     109941653 A     6/2019
CN     109969999 A     7/2019
(Continued)

OTHER PUBLICATIONS

International Search Report dated Jan. 15, 202, Application # PCT/CN2020/122781.

*Primary Examiner* — Kaitlin S Joerger
(74) *Attorney, Agent, or Firm* — Polsinelli PC; Derek D. Donahoe (57) ABSTRACT

A telescopic device (100) and a carrying robot (1000). The telescopic device (100) comprises: a loading base plate (10), telescopic arm assemblies (20), and a driving mechanism (30). The telescopic arm assembly (20) comprises at least two which are provided opposite to each other in a width direction of the loading base plate (10); each telescopic arm assembly (20) comprises a fixed arm (21) and a first sliding arm (22), the fixed arm (21) is mounted at the loading base plate (10), and the first sliding arm (22) is slidably provided at the inner side of the fixed arm (21). The driving mechanism (30) is used for driving the first sliding arm (22) to slide with respect to the fixed arm (21) along a length direction of (Continued)

the loading base plate (10). Because the telescopic device can achieve bi-directional extension and retraction, thereby improving carrying efficiency of the carrying robot.

18 Claims, 6 Drawing Sheets

(56) References Cited

U.S. PATENT DOCUMENTS

| | | | | |
|---|---|---|---|---|
| 2011/0008138 | A1* | 1/2011 | Yamashita | B65G 1/0435 |
| | | | | 414/277 |
| 2015/0037129 | A1* | 2/2015 | Okamoto | B25J 11/005 |
| | | | | 414/800 |
| 2015/0081089 | A1* | 3/2015 | Kapust | B65G 1/0492 |
| | | | | 700/218 |
| 2019/0276235 | A1* | 9/2019 | Gines | B65G 1/1376 |
| 2019/0352092 | A1* | 11/2019 | Zheng | B66F 9/075 |
| 2021/0237976 | A1* | 8/2021 | Tsukamoto | B65G 1/1375 |
| 2022/0204329 | A1* | 6/2022 | Zhan | B66F 9/063 |
| 2022/0242664 | A1* | 8/2022 | Rivoir | B66F 9/141 |
| 2023/0108131 | A1* | 4/2023 | Zhan | B65G 1/0421 |
| | | | | 414/280 |
| 2024/0043207 | A1* | 2/2024 | Cheng | B65G 1/0435 |

FOREIGN PATENT DOCUMENTS

| | | | |
|---|---|---|---|
| CN | 209210309 U | 8/2019 | |
| CN | 110626991 A | 12/2019 | |
| CN | 210825283 U | 6/2020 | |
| JP | 2009280302 A * | 12/2009 | ........... B65G 1/0435 |
| JP | 2017149569 A | 4/2020 | |
| KR | 20190005497 A | 1/2019 | |

\* cited by examiner

TELESCOPIC DEVICE AND CARRYING ROBOT

The present disclosure claims priority to Chinese Patent Application No. 201911014146.0, filed with the Chinese Patent Office on Oct. 23, 2019 and entitled "CLAMPED TELESCOPIC DEVICE AND CARRYING ROBOT THEREOF", which is incorporated herein by reference in its entirety. In addition, the present disclosure claims priority to Chinese Patent Application No. 201921795638.3, filed with the Chinese Patent Office on Oct. 23, 2019 with the utility model name "CARRYING ROBOT", which is incorporated herein by reference in its entirety.

TECHNICAL FIELD

The present disclosure relates to a telescopic device and a carrying robot, and relates to the field of warehousing technologies.

BACKGROUND

A carrying robot is proposed in the related art. The carrying robot is provided with a carrying device, and goods are transported by controlling expansion and contraction of a push rod assembly of the carrying device. However, because a movement direction of the push rod assembly is relatively single, it is inefficient and inconvenient to transport the goods.

SUMMARY

The present disclosure provides a telescopic device and a carrying robot, to solve or alleviate one or more technical problems in the related art.

The present disclosure is implemented through the following technical solutions, to achieve the foregoing objects.

As an aspect of embodiments of the present disclosure, the embodiment of the present disclosure provides a telescopic device, including: a loading base plate; telescopic arm assemblies, wherein there are at least two telescopic arm assemblies which are provided opposite to each other in a width direction of the loading base plate, each of the telescopic arm assemblies includes a fixed arm and a first sliding arm, the fixed arm is installed on the loading base plate, and the first sliding arm is slidably provided at an inner side of the fixed arm; and a driving mechanism configured for driving the first sliding arm to slide relative to the fixed arm along a length direction of the loading base plate.

In an implementation, the driving mechanism includes two belt-wheel assemblies corresponding to two telescopic arm assemblies of the at least two telescopic arm assemblies, wherein each of the belt-wheel assemblies includes a wheel assembly and a synchronous belt, and the synchronous belt is sleeved on the wheel assembly; and a lower surface of the first sliding arm is provided with a rack, and an outer surface of the synchronous belt is drivingly connected to the rack.

In an implementation, both an inner surface and the outer surface of the synchronous belt are provided with a plurality of synchronous teeth, wherein the plurality of synchronous teeth on the inner surface of the synchronous belt are in driving engagement with the wheel assembly, and the plurality of synchronous teeth on the outer surface of the synchronous belt are in driving engagement with the rack.

In an implementation, the driving mechanism further includes a driving motor, wherein the driving motor is configured for driving driving wheels of the two wheel assemblies to operate synchronously.

In an implementation, the wheel assembly includes the driving wheel, at least one driven wheel, and a plurality of tension wheels, the driven wheel operates under the driving of the synchronous belt, and the plurality of tension wheels are arranged at an interval to tension the synchronous belt.

In an implementation, each of the telescopic arm assemblies further includes: a second sliding arm, slidably fitted to an inner side of the first sliding arm; and a transmission mechanism, configured for driving the second sliding arm to slide relative to the first sliding arm during a sliding process of the first sliding arm relative to the fixed arm, wherein a sliding direction of the second sliding arm relative to the first sliding arm is same as a sliding direction of the first sliding arm relative to the fixed arm.

In an implementation, the transmission mechanism includes at least one set of pulley and sliding cable, the sliding cable is slidably fitted to the pulley, the pulley is rotatably arranged on the first sliding arm, two ends of the sliding cable are located at a same side of the pulley, one end of the sliding cable is fixed to the fixed arm, and another end of the sliding cable is fixed to the second sliding arm.

In an implementation, the transmission mechanism includes two sets of the pulleys and the sliding cables, wherein opening directions of the two sliding cables are arranged opposite to each other in the length direction of the loading base plate, and the two pulleys are arranged at an interval in the length direction of the loading base plate.

In an implementation, two ends of the second sliding arm in a length direction are respectively provided with a rocker assembly, wherein the rocker assembly includes a block arm and a feed motor, the block arm includes a first straight arm and a second straight arm, the first straight arm is arranged along the length direction of the second sliding arm, and there is an included angle between the second straight arm and the first straight arm, wherein an output end of the feed motor is drivingly connected to the first straight arm.

In an implementation, the telescopic device further includes:
   a mounting base plate, wherein the mounting base plate is arranged below the loading base plate; and
   a rotating device, wherein the rotating device is arranged between the mounting base plate and the loading base plate, and is configured for driving the loading base plate to rotate relative to the mounting base plate.

As another aspect of the embodiments of the present disclosure, the embodiment of the present disclosure provides a carrying robot, including: a mobile chassis; a shelf installed on the mobile chassis, wherein the shelf has a plurality of trays arranged at an interval along a vertical direction, and the shelf is provided with a lifting device; and according to the telescopic device of the foregoing embodiments of the present disclosure, the telescopic device is installed on the lifting device, and the lifting device is configured for driving the telescopic device to ascend and descend in the vertical direction.

In an implementation, the mobile chassis includes a front chassis, a rear chassis, and a connecting rod assembly, wherein the front chassis is hinged with the rear chassis, the connecting rod assembly includes two longitudinal connecting rods arranged opposite to each other in a width direction of the mobile chassis, a first end of each of the longitudinal connecting rods is hinged with the front chassis, a second end of each of the longitudinal connecting rods is hinged with the rear chassis, and the shelf is installed on the two longitudinal connecting rods.

In an implementation, the connecting rod assembly further includes: a transverse connecting rod, fixed to the front chassis along the width direction of the mobile chassis, wherein first ends of the two longitudinal connecting rods are respectively hinged with both ends of the transverse connecting rod.

In an implementation, the front chassis is connected to the rear chassis via a hinge, wherein the hinge includes a first hinge portion and a second hinge portion, the first hinge portion is fixed to the front chassis, and the second hinge portion is fixed to the rear chassis.

In an implementation, there are two hinges arranged opposite to each other along the width direction of the mobile chassis, the first hinge portion of the hinge is provided with a fixing groove, and the longitudinal connecting rods are installed in the fixing groove.

In an implementation, the connecting rod assembly further includes: rotating arms, wherein there are two rotating arms corresponding to the two longitudinal connecting rods, one end of each of the rotating arms is hinged with a second end of a corresponding longitudinal connecting rod, and another end of each of the rotating arms is hinged with the rear chassis.

In an implementation, each of the longitudinal connecting rods includes a first segment and a second segment connected to the first segment, wherein the first end is formed at an end of the first segment, and the second end is formed at an end of the second segment, wherein an upper surface of the second segment is structured as an installing plane for installing the shelf.

In an implementation, a middle segment is connected between the first segment and the second segment, wherein the upper surface of the second segment is located above an upper surface of the first segment in the vertical direction, and the middle segment is structured as a triangular bracket.

In an implementation, a length of the first segment is less than a length of the second segment.

In an implementation, the mobile base plate further includes a driving device, the driving device includes a driving motor and a driving wheel, an output end of the driving motor is drivingly connected to the driving wheel, and both the motor and the driving wheel are installed on the rear chassis.

One of the foregoing technical solutions has the following advantages or beneficial effects: the telescopic device of the embodiments of the present disclosure can realize bidirectional expansion and contraction, so that the transport efficiency of the carrying robot can be improved.

The foregoing is only for illustration, and is not intended to limit this specification in any way. In addition to the illustrative aspects, implementations, and features described above, further aspects, implementations, and features of the present disclosure will be easily understood by referring to the accompanying drawings and the following detailed description.

BRIEF DESCRIPTION OF THE DRAWINGS

To describe the technical solutions in the embodiments of the present disclosure or the related art more clearly, the following briefly describes the accompanying drawings required for describing the embodiments or the related art. Apparently, the accompanying drawings in the following description are merely some embodiments described in the embodiments of the present disclosure, and a person of ordinary skill in the art may still derive another drawing from these accompanying drawings.

DETAILED DESCRIPTION

Only some exemplary embodiments are briefly described below. As a person skilled in the art may realize, the described embodiments may be modified in different ways without departing from the spirit or scope of the present disclosure. Therefore, the drawings and description are regarded as illustrative and not restrictive in nature.

A telescopic device 100 of the embodiments of the present disclosure will be described below with reference to FIG. 1 to FIG. 3. The telescopic device 100 in the embodiments of the present disclosure may be used for a carrying robot 1000.

Figure 1:
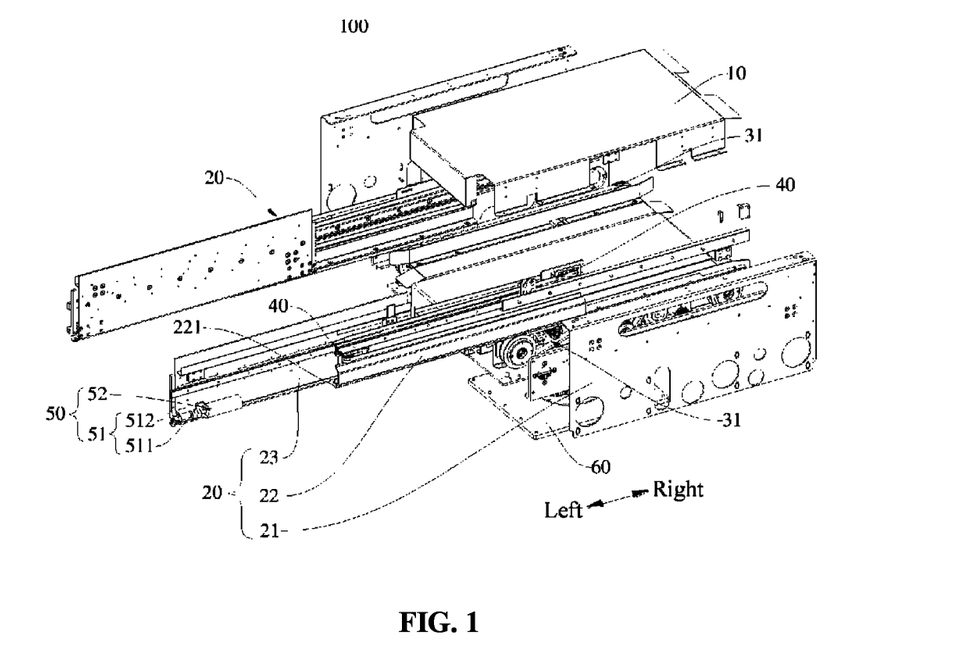
FIG. 1 is a schematic structural diagram of a telescopic device according to an embodiment of the present disclosure.
Figure 2:
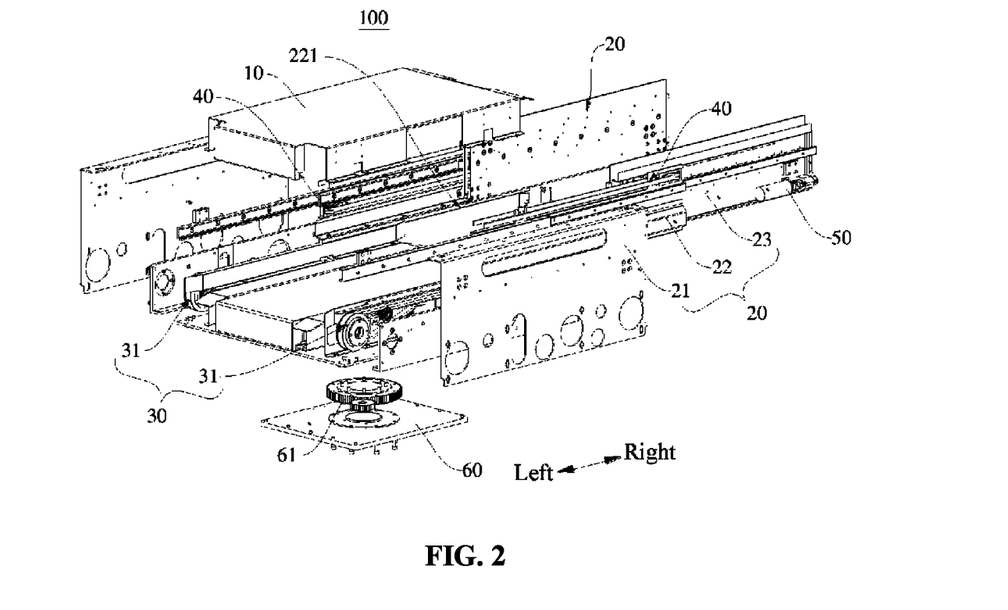
FIG. 2 is a schematic structural diagram of a telescopic device according to an embodiment of the present disclosure.
Figure 3:
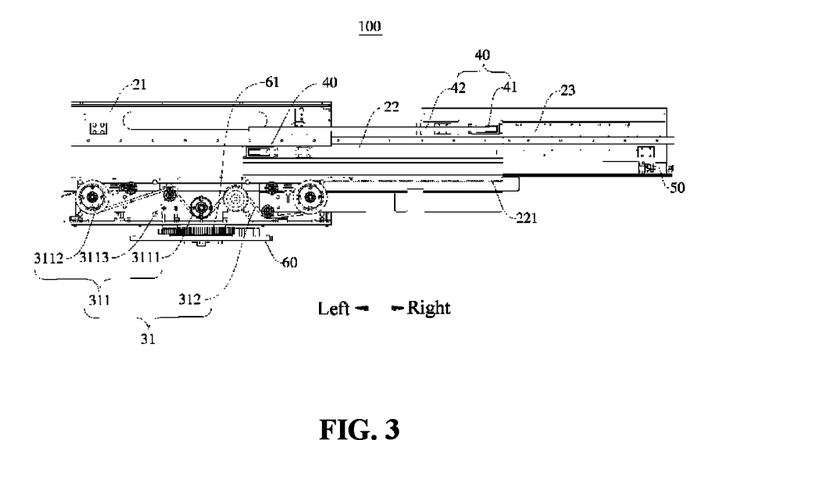
FIG. 3 is a side view of a telescopic device according to an embodiment of the present disclosure.

As shown in FIG. 1 to FIG. 3, the telescopic device 100 of the embodiments of the present disclosure includes a loading base plate 10, telescopic arm assemblies 20, and a driving mechanism 30.

Specifically, there are two telescopic arm assemblies 20 arranged opposite to each other in a width direction of the loading base plate 10, each of the telescopic arm assemblies 20 includes a fixed arm 21 and a first sliding arm 22, the fixed arm 21 is installed on the loading base plate 10, and the first sliding arm 22 is slidably provided at an inner side of the fixed arm 21. The driving mechanism 30 is configured for driving the first sliding arm 22 to slide relative to the fixed arm 21 along a length direction of the loading base plate 10, so as to deliver goods to or from the loading base plate 10.

It may be understood that the length direction of the loading base plate 10 may be a left-right direction as shown in the figure, and the width direction of the loading base plate 10 may be a direction perpendicular to the left-right direction in a horizontal plane as shown in the figure. Herein, the length direction of the fixed arm 21 and the length direction of the first sliding arm 22 are both parallel to the left-right direction as shown in the figure. The driving mechanism 30 drives the two telescopic arm assemblies 20 to protrude from one side of the loading base plate 10, so as to transport the goods onto the loading base plate 10, or move the goods away from the loading base plate 10.

In an example, an inside surface of the fixed arm 21 may be provided with a sliding rail extending along the length direction thereof, and an outside surface of the first sliding arm 22 facing the fixed arm 21 may be provided with a sliding fitting portion fitted to the sliding rail, to ensure sliding stability of the first sliding arm 22 and the fixed arm 21. In addition, in other examples of the present disclosure, the sliding rail may also be arranged on the outside surface of the first sliding arm 22, and the sliding fitting portion may be arranged on the inside surface of the fixed arm 21.

It should be noted that the driving mechanism 30 is adapted to drive the first sliding arm 22 to slide relative to the fixed arm 21 along the left-right direction as shown in the figure. As shown in FIG. 1, the driving mechanism 30 may drive the first sliding arm 22 to slide leftward relative to the fixed arm 21, so that the first sliding arm 22 slides out from a left side of the loading base plate 10. As shown in FIG. 2, the driving mechanism 30 may also drive the first sliding arm 22 to slide rightward relative to the fixed arm 21, so that the first sliding arm 22 slides out from a right side of the loading base plate 10. Preferably, in a case where the first sliding arm 22 is not slid out from the loading base plate 10, the first sliding arm 22 is located at a position overlapping with the fixed arm 21, so as to reduce an external size of the telescopic device 100, thereby reducing a space occupied by the telescopic device 100.

The telescopic device 100 of the embodiments of the present disclosure is provided with the driving mechanism 30 to drive the first sliding arm 22 to slide relative to the fixed arm 21 along the length direction of the loading base plate 10, so that the first sliding arm 22 may be extended from any side of the loading base plate 10 in the length direction. Compared with the carrying device of the carrying robot in the related art, which can only be expanded and contracted from one side, the telescopic device of the embodiments of the present disclosure may directly transport goods on any side of the loading base plate 10 in the length direction without controlling the telescopic device to turn to a corresponding side, thereby improving the transport efficiency and convenience of the telescopic device 100.

In an implementation, as shown in FIG. 1 to FIG. 3, the driving mechanism 30 includes two belt-wheel assemblies 31 corresponding to two telescopic arm assemblies of the at least two telescopic arm assemblies 20, each of the belt-wheel assemblies 31 includes a wheel assembly 311 and a synchronous belt 312, the synchronous belt 312 is sleeved on the wheel assembly 311, and the wheel assembly 311 is used to drive the synchronous belt 312 to operate; and a lower surface of the first sliding arm 22 is provided with a rack 221, and an outer surface of the synchronous belt 312 is drivingly connected to the rack 221, so as to drive the rack 221 to slide relative to the fixed arm 21 along the length direction of the loading base plate 10.

In an example, the two belt-wheel assemblies 31 are respectively located on both sides of the loading base plate 10 in the width direction. The synchronous belt 312 is sleeved on the wheel assembly 311 and is tensioned by the wheel assembly 311, and the wheel assembly 311 drives the synchronous belt 312 to operate in a clockwise direction or a counterclockwise direction. A part of the outside surface of the synchronous belt 312 forms a transmission connection with the rack 221, and may drive the rack 221 to move left or right along the length direction of the loading base plate 10, so that the rack 221 drives the first sliding arm 22 to slide leftward or rightward relative to the fixed arm 21.

In an implementation, both an inner surface and the outer surface of the synchronous belt 312 are provided with a plurality of synchronous teeth, the plurality of synchronous teeth on the inner surface of the synchronous belt 312 are in driving engagement with the wheel assembly 311, and the plurality of synchronous teeth on the outer surface of the synchronous belt 312 are in driving engagement with the rack 221. Therefore, the transmission effect among the synchronous belt 312 and the wheel assembly 311 and the rack 221 is good, and there may be a relatively stable transmission ratio between the wheel assembly 311 and the rack 221, thereby improving the sliding stability of the first sliding arm 22 relative to the fixed arm 21.

In addition, in other examples of the present disclosure, the synchronous belt 312 may also be a chain with chain nests on both the inner surface and the outer surface, the wheel assembly 311 may include a plurality of synchronous wheels, and each of the synchronous wheels has sprocket teeth matching with the plurality of chain nests on the inner surface of the chain, and the rack 221 is provided with synchronous teeth matching with the plurality of chain nests on the outer surface of the chain.

In an implementation, the driving mechanism 30 further includes a driving motor (not shown in the figure), and the driving motor is configured for driving driving wheels 3111 of the two wheel assemblies 311 to operate synchronously.

In an example, a synchronous rod is connected between synchronous wheels of the two wheel assemblies 311, and the output end of the driving motor is drivingly connected to the synchronous rod, so that the driving motor drives the driving wheels 3111 of the two wheel assemblies 311 to operate synchronously. Therefore, the synchronization of the belt-wheel assemblies 31 of the two driving mechanisms 30 during the operating process can be ensured, so as to keep the movements of the two telescopic arm assemblies 20 consistent.

In an implementation, as shown in FIG. 3, each wheel assembly 311 includes the driving wheel 3111, at least one driven wheel 3112 and a plurality of tension wheels 3113, the driven wheel 3112 operates under the driving of the synchronous belt 312, and the plurality of tension wheels 3113 are arranged at an interval, to tension the synchronous belt 312.

In an example, there are two driven wheels 3112 arranged at an interval along the length direction of the loading base plate 10, and a portion of the synchronous belt 312 located between the vertices of the two driven wheels 3112 forms a transmission connection with the rack 221. The plurality of tension wheels 3113 are provided to ensure that the portion of the synchronous belt 312 located between the vertices of the two driven wheels 3112 operates along the length direction of the loading base plate 10, thereby improving the stability of the transmission connection between the synchronous belt 312 and the rack 221, and further improving the stability of the telescopic arm assemblies 20.

In an implementation, as shown in FIG. 1 to FIG. 3, each of the telescopic arm assemblies 20 further includes a second sliding arm 23 and a transmission mechanism 40. The second sliding arm 23 is slidably fitted to an inner side of the first sliding arm 22. In other words, the first sliding arm 22 is located between the second sliding arm 23 and the fixed arm 21, and the second sliding arm 23 may slide leftward or rightward along the length direction of the loading base plate 10 relative to the first sliding arm 22. The transmission mechanism 40 is configured for driving the second sliding arm 23 to slide relative to the first sliding arm 22 during a sliding process of the first sliding arm 22 relative to the fixed arm 21, and a sliding direction of the second sliding arm 23 relative to the first sliding arm 22 is same as a sliding direction of the first sliding arm 22 relative to the fixed arm 21. Herein, the length direction of the second sliding arm 23 may be parallel to the left-right direction as shown in the figure. Preferably, in a case where the telescopic arm assemblies 20 is in a retracted state, the second sliding arm 23, the first sliding arm 22 and the fixed arm 21 overlap, thereby reducing the external dimension of the telescopic arm assemblies 20 and thus reducing the volume of the telescopic device 100.

In an example, the transmission mechanism 40 may be an electric push rod. Specifically, the electric push rod is installed on the fixed arm 21, and an end of a telescopic rod of the electric push rod is connected to the second sliding arm 23. In a case where the first sliding arm 22 slides relative to the fixed arm 21, the electric push rod pushes the second sliding arm 23 to slide synchronously relative to the first sliding arm 22. In order to keep the sliding direction of the second sliding arm 23 relative to the first sliding arm 22 consistent with the sliding direction of the first sliding arm 22 relative to the fixed arm 21, two electric push rods may be provided, and the two electric push rods are provided in opposite directions. Herein, one electric push rod is used to push the second sliding arm 23 to slide leftward relative to the first sliding arm 22, and the other electric push rod is used to push the second sliding arm 23 to slide rightward relative to the first sliding arm 22.

In an implementation, the transmission mechanism 40 includes at least one set of pulley 41 and sliding cable 42, the sliding cable 42 is slidably fitted to the pulley 41, the pulley 41 is rotatably arranged on the first sliding arm 22, two ends of the sliding cable 42 are located at a same side of the pulley 41, one end of the sliding cable 42 is fixed to the fixed arm 21, and the other end of the sliding cable 42 is fixed to the second sliding arm 23.

Specifically, a middle part of the sliding cable 42 is disposed to bend so that two ends of the sliding cable 42 are opposite to each other. As a result, the sliding cable 42 forms a U-shape, and the pulley 41 is drivingly connected to the curved part of the sliding cable 42. Since the pulley 41 is fixed to the first sliding arm 22, one end of the sliding cable 42 is fixed to the fixed arm 21, and the other end of the sliding cable 42 is fixed to the second fixed arm 21, the pulley 41 and the sliding cable 42 form a movable pulley structure. In a case where the first sliding arm 22 slides relative to the fixed arm 21, the first sliding arm 22 drives the pulley to move relative to one end of the sliding cable 42 fixed on the fixed arm 21, so that the other end of the sliding cable 42 drives the second fixed arm 21 to move.

It may be understood that the sliding direction of the second fixed arm 21 relative to the first fixed arm 21 is the same as the sliding direction of the first fixed arm 21 relative to the fixed arm 21, and a sliding speed of the second fixed arm 21 relative to the fixed arm 21 is twice as fast as a sliding speed of the first fixed arm 21 relative to the fixed arm 21. Therefore, in a case where the driving mechanism 30 drives the first sliding arm 22 to slide relative to the fixed arm 21, the second fixed arm 21 may slide synchronously relative to the first sliding arm 22, thereby increasing a telescopic length of the sliding arm assembly and improving an effective distance of the telescopic arm assemblies 20 for transporting goods.

Preferably, as shown in FIG. 3, the transmission mechanism 40 includes two sets of the pulleys 41 and the sliding cables 42, opening directions of the two sliding cables 42 are arranged opposite to each other in the length direction of the loading base plate 10, and the two pulleys 41 are arranged at an interval in the length direction of the loading base plate 10. Specifically, the two sets of pulleys 41 and the sliding cables 42 constitute two sets of movable pulleys respectively, and the two sets of movable pulleys are arranged at an interval in an up-down direction. The opening directions of the two sliding cables 42 are arranged opposite to each other, wherein the opening direction of the sliding cable 42 corresponding to the left pulley 41 is rightward, and the opening direction corresponding to the right pulley 41 is leftward. Therefore, through arranging the two sets of pulleys 41 and the sliding cables 42, the driving efficiency of the transmission mechanism 40 to the second sliding arm 23 can be improved, and it is beneficial to improve the sliding stability of the second sliding arm 23 relative to the first sliding arm 22.

In an implementation, as shown in FIG. 1 to FIG. 3, two ends of the second sliding arm 23 in a length direction are respectively provided with a rocker assembly 50, the rocker assembly 50 includes a block arm 51 and a feed motor 52, the block arm 51 includes a first straight arm 511 and a second straight arm 512, the first straight arm 511 is arranged along the length direction of the second sliding arm 23, and there is an included angle between the second straight arm 512 and the first straight arm 511, wherein an output end of the feed motor 52 is drivingly connected to the first straight arm 511.

In an example, as shown in FIG. 1, the rocker assembly 50 is arranged on a side surface of the second sliding arm 23 facing the first sliding arm 22. In order to prevent the rocker assembly 50 from interfering with the relative movement between the second sliding arm 23 and the first sliding arm 22, the side surface of the first sliding arm 22 facing the second sliding arm 23 is provided with a shelter groove for accommodating the rocker assembly 50. Further, a circumferential direction of the first straight arm 511 may be set along the left-right direction, the second straight arm 512 is connected to an end of the first straight arm 511, and the included angle between the second straight arm 512 and the first straight arm 511 is a right angle. The feed motor 52 drives the second straight arm 512 to rotate by driving the first straight arm 511 to rotate around an axial direction thereof. It may be understood that, in a case of transporting goods, the telescopic arm assemblies 20 drive the block arm 51 to rotate to a horizontal angle by controlling the feed motor 52, so that the second straight arm 512 of the block arm 51 may push and pull the goods, so as to transport the goods to or away from the loading base plate 10.

In an implementation, the telescopic device 100 further includes a mounting base plate 60 and a rotating device 61. The mounting base plate 60 is arranged below the loading base plate 10, and the rotating device 61 is arranged between the mounting base plate 60 and the loading base plate 10, and is configured for driving the loading base plate 10 to rotate relative to the mounting base plate 60. Therefore, the loading base plate 10 may rotate to different angles in the horizontal direction relative to the mounting base plate 60, so as to adjust the telescopic direction of the telescopic arm assemblies 20 and increase the goods transport range of the telescopic device 100.

A carrying robot 1000 according to the embodiments of the present disclosure will be described below with reference to FIG. 4 to FIG. 7.

Figure 4:
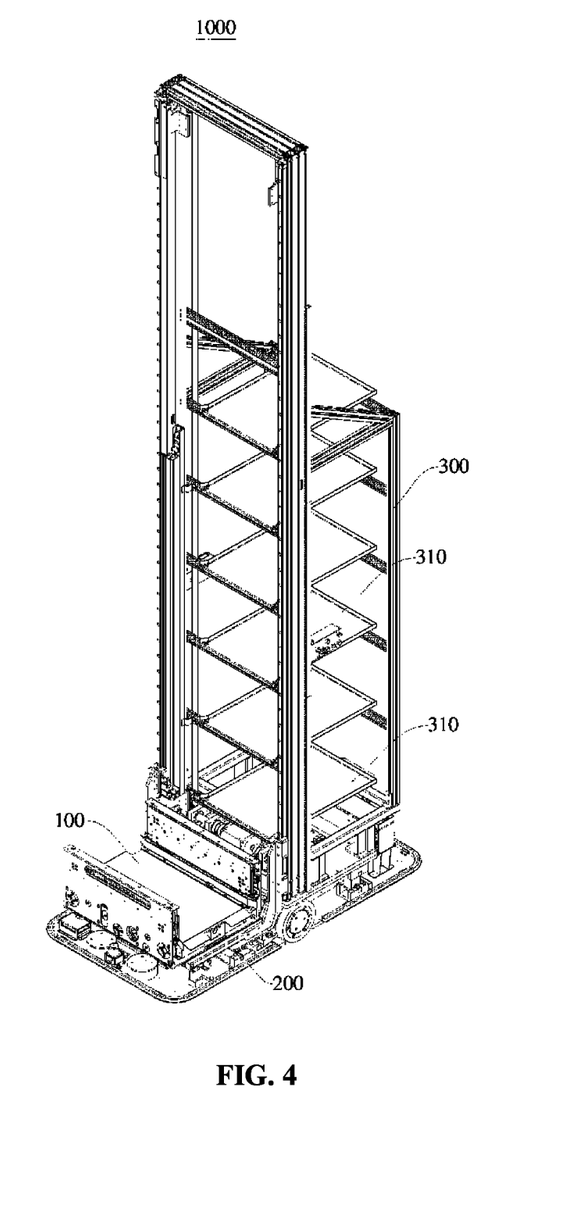
FIG. 4 is a schematic structural diagram of a carrying robot according to an embodiment of the present disclosure.
Figure 5:
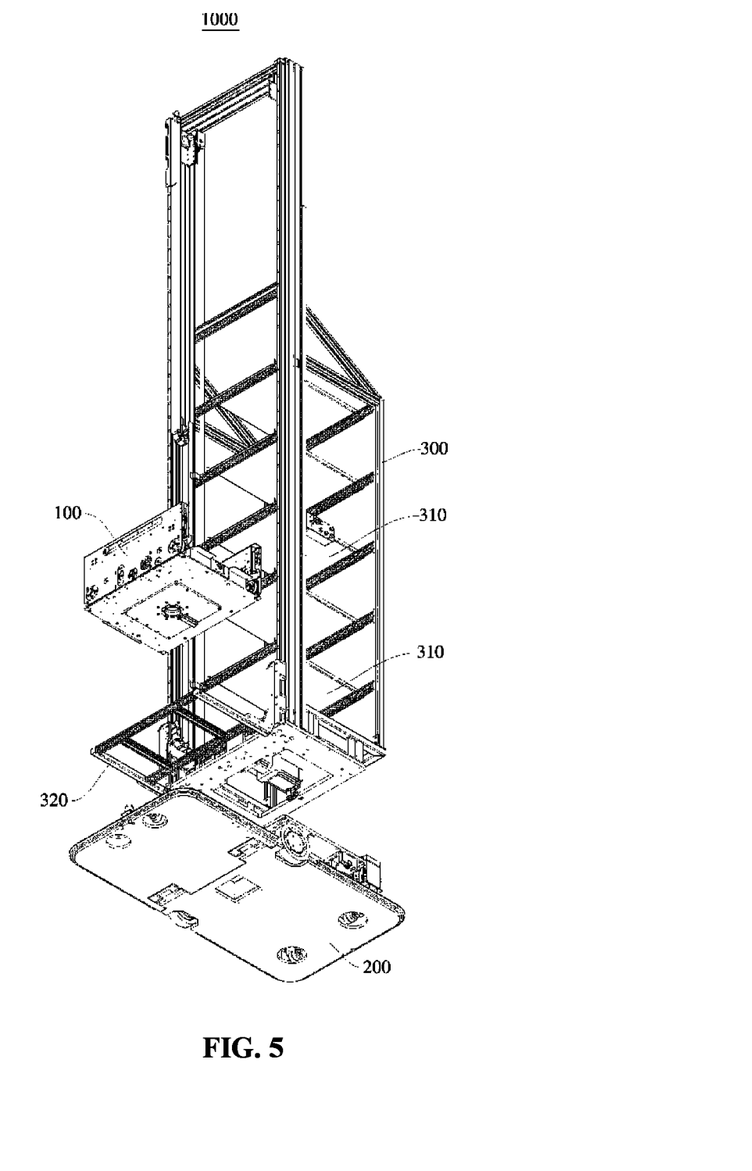
FIG. 5 is an exploded diagram of a carrying robot according to an embodiment of the present disclosure.

As shown in FIG. 4, the carrying robot 1000 according to the embodiments of the present disclosure includes a mobile chassis 200, a shelf 300, and the telescopic device 100 according to the foregoing embodiments of the present disclosure. The mobile chassis 200 is suitable for driving the shelf 300 to move in a warehouse.

Specifically, the shelf 300 is installed on the mobile chassis 200, the shelf 300 has a plurality of trays 310 arranged at an interval in the vertical direction, and the trays 310 are used to temporarily store goods. The shelf 300 is provided with a lifting device 320, the telescopic device 100 is installed on the lifting device 320, the lifting device 320 is used to drive the telescopic device 100 to ascend and descend in the vertical direction, so that the telescopic device 100 can ascend or descend to a corresponding tray 310, and the telescopic arm assemblies 20 are used to transport goods between the loading base plate 10 and the trays 310.

The mobile chassis 200 includes a front chassis 201, a rear chassis 202, and a connecting rod assembly 70. The front chassis 201 is hinged with the rear chassis 202. The connecting rod assembly 70 includes two longitudinal connecting rods 71 arranged opposite to each other in the width direction of the mobile chassis 200. Each of the longitudinal connecting rods 71 has a first end 71*aa* and a second end 71*b* in the length direction, the first end 71*aa* of the longitudinal connecting rod 71 is hinged with the front chassis 201, and the second end 71*b* of the longitudinal connecting rod 71 is hinged with the rear chassis 202. Herein, the length direction of the mobile chassis 200 may be a front-rear direction in the figure, the width direction of the mobile chassis 200 may be a direction perpendicular to the front-rear direction in a horizontal plane in the figure, the length direction of the longitudinal connecting rod 71 is parallel to the length direction of the mobile chassis 200, and the mobile chassis 200 is installed on the two longitudinal connecting rods 71.

In an example, a rear side edge of the front chassis 201 is hinged with a front side edge of the rear chassis 202, so that the front chassis 201 may be rotated at a specific angle relative to the rear chassis. The two longitudinal connecting rods 71 are arranged above the mobile chassis 200, the first end 71*aa* of each of the longitudinal connecting rods 71 is hinged with the front chassis 201, and the second end 71*b* of each of the longitudinal connecting rods 71 is hinged with the rear chassis 202. In this way, during the rotating process of the front chassis 201 relative to the rear chassis 202, the longitudinal connecting rods 71 rotate relative to both the front chassis 201 and the rear chassis 202, so that the front chassis 201, the rear chassis 202 and the longitudinal connecting rods 71 form a triangular structure.

The carrying robot 1000 according to the embodiments of the present disclosure is provided with the front chassis 201 and the rear chassis 202 hinged to each other, and in a case where the mobile chassis 200 is driving on an unstable ground, the front chassis 201 and the rear chassis 202 may rotate relative to each other to adjust the contact condition between the mobile chassis 200 and the ground, so that the mobile chassis 200 can run smoothly. Therefore, the carrying robot 1000 according to the embodiments of the present disclosure has better adaptability to the ground. Furthermore, by arranging two longitudinal connecting rods 71 hinged with the front chassis 201 and the rear chassis 202 respectively, a load at a hinged joint of the front chassis 201 and the rear chassis 202 may be reduced, thereby improving the structural strength and rigidity of the mobile chassis 200 and thus reducing a failure rate of the mobile chassis 200.

Figure 6:
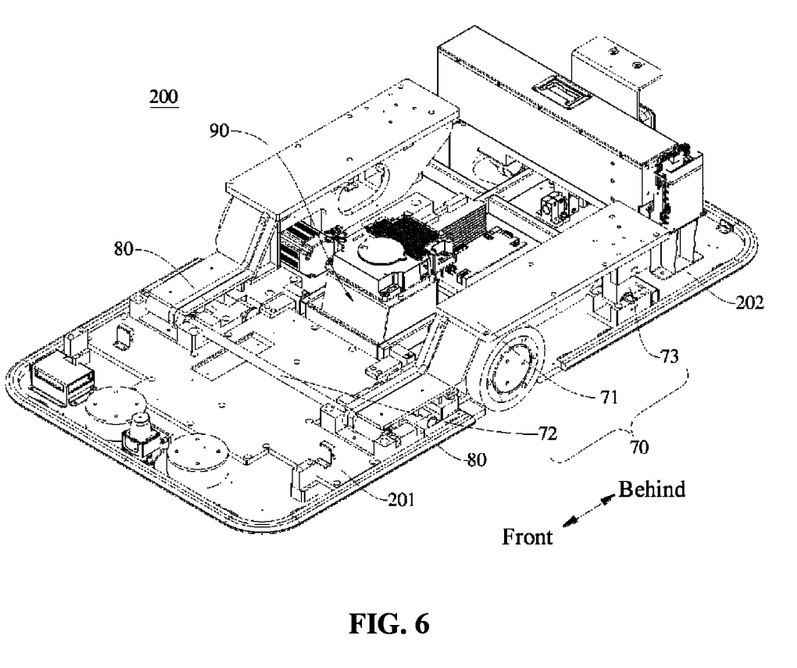
FIG. 6 is a schematic structural diagram of a mobile chassis of a carrying robot according to an embodiment of the present disclosure.
Figure 7:
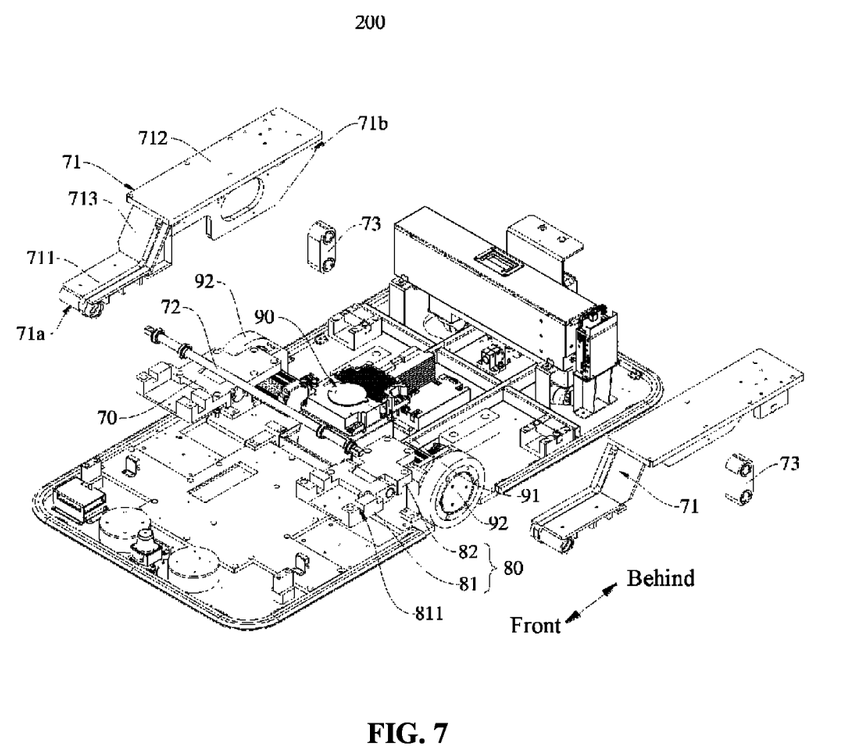
FIG. 7 is an exploded diagram of a mobile chassis of a carrying robot according to an embodiment of the present disclosure.

In an implementation, as shown in FIG. 6 and FIG. 7, the connecting rod assembly 70 further includes a transverse connecting rod 72. The transverse connecting rod 72 is fixed to the front chassis 201 along the width direction of the mobile chassis 200, and the first ends 71*aa* of the two longitudinal connecting rods 71 are respectively hinged with both ends of the transverse connecting rod 72. It may be understood that an axial direction of the transverse connecting rod 72 is parallel to the width direction of the mobile chassis 200. By arranging the transverse connecting rod 72, not only the structural strength of the connecting rod assembly 70 can be improved, but also the overall structural strength of the front chassis 201 can be improved.

In an implementation, as shown in FIG. 6 and FIG. 7, the front chassis 201 is connected to the rear chassis 202 via a hinge 80, wherein the hinge 80 includes a first hinge portion 81 and a second hinge portion 82, the first hinge portion 81 is fixed on the front chassis 201, and the second hinge portion 82 is fixed on the rear chassis 202. Preferably, the first hinge portion 81 is arranged on an upper surface of the front chassis 201, the second hinge portion 82 is arranged on an upper surface of the rear chassis 202, and a rear side surface of the front chassis 201 may contact a front side surface of the rear chassis 202. Therefore, the front chassis 201 and the rear chassis 202 may form a self-locking effect, to prevent a maximum included angle between the upper surface of the front chassis 201 and the upper surface of the rear chassis 202 from exceeding 180°.

In an implementation, as shown in FIG. 6 and FIG. 7, there are two hinges 80 arranged opposite to each other along the width direction of the mobile chassis 200, the first hinge portion 81 of each hinge 80 is provided with a fixing groove 811, and the longitudinal connecting rods 71 are installed in the fixing groove 811. Therefore, the connection effect between the front chassis 201 and the rear chassis 202 can be improved, and the relative rotation between the front chassis 201 and the rear chassis 202 is more stable.

In an example, the first end 71*aa* of the longitudinal connecting rod 71 is provided with a shaft sleeve, and the shaft sleeve is rotatably sleeved on the transverse connecting rod 72. An upper surface of the first hinge portion 81 is provided with upward opening fixing grooves 811, there are two fixing grooves 811 arranged opposite to each other along the width direction of the mobile chassis 200, and the shaft sleeve is clamped in the two fixing grooves 811. In this way, the first end 71*aa* of the longitudinal connecting rod 71 may be limited in the width direction of the mobile chassis 200.

In an implementation, as shown in FIG. 6 and FIG. 7, the connecting rod assembly 70 further includes: rotating arms 73, wherein there are two rotating arms 73 corresponding to the two longitudinal connecting rods 71, one end of each of the rotating arms 73 is hinged with a second end 71*b* of a corresponding longitudinal connecting rod 71, and the other end of each of the rotating arms 73 is hinged with the rear chassis 202.

It may be understood that during the rotating process of the front chassis 201 relative to the rear chassis 202, the longitudinal connecting rod 71 rotates relative to the front chassis 201, and at the same time, the rotating arms 73 between the second end 71*b* of the longitudinal connecting rod 71 and the rear chassis 202 also rotate. Driven by the rotating arms 73, a rotation angle of the longitudinal connecting rod 71 relative to the rear chassis 202 is relatively small, so that an inclination angle of the shelf 300 located on the longitudinal connecting rod 71 is also relatively small, preventing the shelf 300 from tilting at a large angle. In this way, the goods are prevented from slipping off the shelf 300, and the stability of the shelf 300 and the carrying robot 1000 is ensured.

In an implementation, as shown in FIG. 7, each of the longitudinal connecting rods 71 includes a first segment 711 and a second segment 712 connected to the first segment 711, the first end 71*aa* is formed at an end of the first segment 711, and the second end 71*b* is formed at an end of the second segment 712, wherein an upper surface of the second segment 712 is structured as an installing plane 712*a* for installing the shelf 300. In an example, the shelf 300 and the second segment 712 may be positioned by a positioning pin and connected by a bolt, so that the accuracy of a docking position between the shelf 300 and the mobile chassis 200 can be ensured, and the connection strength between the shelf 300 and the mobile chassis 200 can be ensured.

In an implementation, continuing to refer to FIG. 7, a middle segment 713 is connected between the first segment 711 and the second segment 712, wherein the upper surface of the second segment 712 is located above an upper surface of the first segment 711 in the vertical direction, and the middle segment 713 is structured as a triangular bracket. Preferably, the second segment 712 is structured as a right-angled triangle structure, wherein a part of the second segment 712 that forms a beveled edge is connected between the first segment 711 and the second segment 712, and one right-angled side of the second segment 712 is supported on the upper surface of the rear chassis 202. Therefore, the contact area between the longitudinal connecting rods 71 and the mobile chassis 200 may be increased, the pressure of the shelf 300 on the longitudinal connecting rods 71 may be reduced, and the structural strength of the longitudinal connecting rods 71 may be improved.

Further, a length of the first segment 711 is less than a length of the second segment 712. Therefore, on the one hand, an area of an installation plane 712a on the second segment 712 may be increased, thereby enabling the installation of the shelf 300 more stable; on the other hand, in a case where the front chassis rotates relative to the rear chassis 202, an inclination angle of the second segment 712 relative to the rear chassis 202 may be reduced, thereby further improving the stability of the shelf 300.

In an implementation, as shown in FIG. 7, the mobile base plate further includes a driving device 90. The driving device 90 includes a driving motor 91 and a driving wheel 92, an output end of the driving motor 91 is drivingly connected to the driving wheel 92, and both the motor and the driving wheel 92 are installed on the rear chassis 202.

In an example, there are two driving wheels 92 arranged at an interval in the width direction of the mobile chassis 200, and the driving motor 91 is used to drive the two driving wheels 92 to operate independently. Herein, the driving motor 91 is in electrical communication with a controller of the carrying robot 1000, and by controlling the driving motor 91 to drive the two driving wheels 92 to operate at same or different rotational speeds or directions, the mobile chassis 200 may be controlled to drive in a straight line or turn. Further, the mobile chassis 200 further includes a steering wheel, wherein the steering wheel may be a universal wheel.

In addition, other components of the carrying robot 1000 in the foregoing embodiments may adopt various technical solutions known to those of ordinary skill in the art now and in the future, which will not be described in detail herein.

In the description of this specification, it should be understood that orientations or position relationships indicated by terms "center", "longitudinal", "lateral", "length", "width", "thickness", "up", "down", "front", "back", "left", "right", "vertical", "horizontal", "top", "bottom", "inner", "outer", "clockwise", "counterclockwise", "axial", "radial", "circumferential", and the like are based on the orientations or position relationships shown in the drawings, and are only for ease of describing the present disclosure and simplifying the description, rather than indicating or implying that the referred device or element must have a specific orientation, be configured and operated in a specific orientation, and therefore cannot be understood as a limitation of the present disclosure.

In addition, terms "first" and "second" are used for the purpose of description only, and are not to be understood as indicating or implying relative importance or implicitly indicating the number of technical features indicated. Thus, a feature defined by "first" or "second" may explicitly or implicitly include one or more of the features. In the description of the present disclosure, "a plurality of" means two or more, unless specifically defined otherwise.

In the present disclosure, unless specifically defined and limited otherwise, terms "installed", "linked", "connected", "fixed", and the like should be understood in a broad sense, for example, it may be a fixed connection, a detachable connection, or a whole; it may be a mechanical connection, an electrical connection, or a communication; it may be a direct link or an indirect link through an intermediary, and it may be an internal connection between two elements or an interaction relationship between two elements. For a person of ordinary skill in the art, the specific meanings of the foregoing terms in the present disclosure may be understood according to specific circumstances.

In the present disclosure, unless specifically defined and limited otherwise, that the first feature is "above" or "below" the second feature may include direct contact of the first and second features, and may also include indirect contact through some other features between them. Moreover, that the first feature is "above", "over" or "upward" the second feature includes the first feature being directly above and obliquely above the second feature, or it simply means that a horizontal height of the first feature is higher than that of the second feature. That the first feature is "below", "underneath" or "under" the second feature includes the first feature being directly below and obliquely below the second feature, or it simply means that a horizontal height of the first feature is lower than that of the second feature.

The foregoing disclosure provides many different implementations or examples for realizing different structures of the present disclosure. To simplify the disclosure of the present disclosure, components and settings of specific examples are described above. They are certainly only examples, and are not intended to limit the present disclosure. In addition, the present disclosure may repeat reference numerals and/or reference letters in different examples, and this repetition is for the purpose of simplification and clarity, and does not indicate relationships between various implementations and/or settings that are discussed.

What is described above are only specific implementations of the present disclosure, but the scope of protection of the present disclosure is not limited to this. Any person skilled in the art may easily think of variations or substitutions within the scope of the technology disclosed in the present disclosure, which shall be covered in the protection scope of the present disclosure. Therefore, the protection scope of the present disclosure should be subject to the protection scope of the claims.

What is claimed is:

1. A telescopic device, comprising:
    a loading base plate;
    telescopic arm assemblies, wherein there are at least two telescopic arm assemblies which are provided opposite to each other in a width direction of the loading base plate, each of the telescopic arm assemblies comprises a fixed arm and a first sliding arm, the fixed arm is installed on the loading base plate, and the first sliding arm is slidably provided at an inner side of the fixed arm; and
    a driving mechanism configured for driving the first sliding arm to slide relative to the fixed arm along a length direction of the loading base plate, so that the first sliding arm extends from any side of the loading base plate;
a mounting base plate, wherein the mounting base plate is arranged below the loading base plate; and
a rotating device, wherein the rotating device is arranged between the mounting base plate and the loading base plate, and is configured for driving the loading base plate to rotate relative to the mounting base plate;
wherein the driving mechanism comprises two belt-wheel assemblies corresponding to two telescopic arm assemblies of the at least two telescopic arm assemblies, wherein each of the belt-wheel assemblies comprises a wheel assembly and a synchronous belt, the synchronous belt is sleeved on the wheel assembly, and the wheel assembly drives the synchronous belt to operate in a clockwise direction or a counterclockwise direction; and
wherein a lower surface of the first sliding arm is provided with a rack, and an outer surface of the synchronous belt is drivingly connected to the rack, to drive the rack to slide relative to the fixed arm along the length direction of the loading base plate from any side of the loading base plate.

2. The telescopic device of claim 1, wherein both an inner surface and the outer surface of the synchronous belt are provided with a plurality of synchronous teeth, wherein the plurality of synchronous teeth on the inner surface of the synchronous belt are in driving engagement with the wheel assembly, and the plurality of synchronous teeth on the outer surface of the synchronous belt are in driving engagement with the rack.

3. The telescopic device of claim 1, wherein the driving mechanism further comprises a driving motor, wherein the driving motor is configured for driving the driving wheels of the two wheel assemblies to operate synchronously.

4. The telescopic device of claim 1, wherein each of the telescopic arm assemblies further comprises:
a second sliding arm, slidably fitted to an inner side of the first sliding arm; and
a transmission mechanism, configured for driving the second sliding arm to slide relative to the first sliding arm during a sliding process of the first sliding arm relative to the fixed arm, wherein a sliding direction of the second sliding arm relative to the first sliding arm is same as a sliding direction of the first sliding arm relative to the fixed arm.

5. The telescopic device of claim 4, wherein the transmission mechanism comprises at least one set of pulley and sliding cable, wherein the sliding cable is slidably fitted to the pulley, the pulley is rotatably arranged on the first sliding arm, two ends of the sliding cable are located at a same side of the pulley, one end of the sliding cable is fixed to the fixed arm, and another end of the sliding cable is fixed to the second sliding arm.

6. The telescopic device of claim 5, wherein the transmission mechanism comprises two sets of the pulleys and the sliding cables, wherein opening directions of the two sliding cables are arranged opposite to each other in the length direction of the loading base plate, and the two pulleys are arranged at an interval in the length direction of the loading base plate.

7. The telescopic device of claim 4, wherein two ends of the second sliding arm in a length direction are respectively provided with a rocker assembly, wherein the rocker assembly comprises a block arm and a feed motor, the block arm comprises a first straight arm and a second straight arm, the first straight arm is arranged along the length direction of the second sliding arm, and there is an included angle between the second straight arm and the first straight arm, wherein an output end of the feed motor is drivingly connected to the first straight arm.

8. A carrying robot, comprising:
a mobile chassis;
a shelf installed on the mobile chassis, wherein the shelf has a plurality of trays arranged at an interval along a vertical direction, and the shelf is provided with a lifting device; and
the telescopic device of claim 1, wherein the telescopic device is installed on the lifting device, and the lifting device is configured for driving the telescopic device to ascend and descend in the vertical direction.

9. The carrying robot of claim 8, wherein the mobile chassis comprises a front chassis, a rear chassis and a connecting rod assembly, wherein the front chassis is hinged with the rear chassis, the connecting rod assembly comprises two longitudinal connecting rods arranged opposite to each other in a width direction of the mobile chassis, a first end of each of the longitudinal connecting rods is hinged with the front chassis, a second end of each of the longitudinal connecting rods is hinged with the rear chassis, and the shelf is installed on the two longitudinal connecting rods.

10. The carrying robot of claim 9, wherein the connecting rod assembly further comprises:
a transverse connecting rod, fixed to the front chassis along the width direction of the mobile chassis, wherein first ends of the two longitudinal connecting rods are respectively hinged with both ends of the transverse connecting rod.

11. The carrying robot of claim 10, wherein the front chassis is connected to the rear chassis via a hinge, wherein the hinge comprises a first hinge portion and a second hinge portion, the first hinge portion is fixed to the front chassis, and the second hinge portion is fixed to the rear chassis.

12. The carrying robot of claim 11, wherein there are two hinges arranged opposite to each other along the width direction of the mobile chassis, the first hinge portion of the hinge is provided with a fixing groove, and the longitudinal connecting rods are installed in the fixing groove.

13. The carrying robot of claim 9, wherein the connecting rod assembly further comprises:
rotating arms, wherein there are two rotating arms corresponding to the two longitudinal connecting rods, one end of each of the rotating arms is hinged with a second end of a corresponding longitudinal connecting rod, and another end of each of the rotating arms is hinged with the rear chassis.

14. The carrying robot of claim 9, wherein each of the longitudinal connecting rods comprises a first segment and a second segment connected to the first segment, wherein the first end is formed at an end of the first segment, and the second end is formed at an end of the second segment, wherein an upper surface of the second segment is structured as an installing plane for installing the shelf.

15. The carrying robot of claim 14, wherein a middle segment is connected between the first segment and the second segment, wherein the upper surface of the second segment is located above an upper surface of the first segment in the vertical direction, and the middle segment is structured as a triangular bracket.

16. The carrying robot of claim 14, wherein a length of the first segment is less than a length of the second segment.

17. The carrying robot of claim 9, wherein the mobile chassis further comprises a driving device, wherein the driving device comprises a driving motor and a driving wheel, an output end of the driving motor is drivingly connected to the driving wheel, and both the driving motor and the driving wheel are installed on the rear chassis.

18. The telescopic device of claim 1, wherein the wheel assembly comprises a driving wheel, at least one driven wheel and a plurality of tension wheels, the driven wheel operates under the driving of the synchronous belt, and the plurality of tension wheels are arranged at an interval to tension the synchronous belt.

* * * * *